United States Patent
Chopra et al.

(10) Patent No.: US 12,200,629 B2
(45) Date of Patent: Jan. 14, 2025

(54) SUB-BAND SELECTION AT CELLULAR BASE STATION FOR NON-OVERLAPPED OR PARTIALLY OVERLAPPED FULL DUPLEX OPERATION

(71) Applicant: AT&T Intellectual Property I, L.P., Atlanta, GA (US)

(72) Inventors: Aditya Chopra, Austin, TX (US); Salam Akoum, Austin, TX (US); Thomas Novlan, Jonestown, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 437 days.

(21) Appl. No.: 17/730,732

(22) Filed: Apr. 27, 2022

(65) Prior Publication Data
US 2023/0354213 A1 Nov. 2, 2023

(51) Int. Cl.
| | |
|---|---|
| *H04W 72/04* | (2023.01) |
| *H04L 5/00* | (2006.01) |
| *H04L 5/14* | (2006.01) |
| *H04W 52/24* | (2009.01) |
| *H04W 72/0446* | (2023.01) |
| *H04W 72/541* | (2023.01) |

(52) U.S. Cl.
CPC ......... *H04W 52/243* (2013.01); *H04L 5/0058* (2013.01); *H04L 5/14* (2013.01); *H04W 72/0446* (2013.01); *H04W 72/541* (2023.01)

(58) Field of Classification Search
CPC ........... H04W 52/243; H04W 72/0446; H04W 72/541; H04L 5/0058; H04L 5/14; H04L 5/1461
See application file for complete search history.

(56) References Cited

U.S. PATENT DOCUMENTS

| | | | | |
|---|---|---|---|---|
| 5,584,049 A | * | 12/1996 | Weaver, Jr. .......... | H04B 7/2628 455/67.11 |
| 2010/0040184 A1 | | 2/2010 | Haralabidis et al. | |
| 2012/0002578 A1 | | 1/2012 | Ji et al. | |
| 2013/0188536 A1 | | 7/2013 | Pirskanen et al. | |
| 2014/0286205 A1 | | 9/2014 | Ghaboosi et al. | |

(Continued)

*Primary Examiner* — Lan-Huong Truong
(74) *Attorney, Agent, or Firm* — Guntin & Gust, PLC; Dana B. LeMoine

(57) ABSTRACT

Aspects of the subject disclosure may include, for example, determining a self-interference channel response of a transceiver of a mobile base station having a transmitter and a receiver. The self-interference channel response spans multiple sub-bands of a predetermined mobile cellular frequency channel. A first sub-band of the multiple sub-bands is identified according to the self-interference channel response and, an estimate is determined, at the receiver, of a first coupled transmit power level of the transmitter when operating within the first sub-band. A receiver sensitivity is adjusted according to the first coupled transmit power level to obtain an adjustment adapted to increase receiver sensitivity, while restricting operation of the receiver to a substantially linear region. The adjustment allows a transmission within the first sub-band and a reception within a second sub-band of the plurality of sub-bands to occur simultaneously at the mobile base station. Other embodiments are disclosed.

20 Claims, 10 Drawing Sheets

(56) References Cited

U.S. PATENT DOCUMENTS

| | | | |
|---|---|---|---|
| 2015/0171957 A1* | 6/2015 | Featherston | H04B 10/11 |
| | | | 398/38 |
| 2015/0181609 A1* | 6/2015 | Nusairat | H04W 72/121 |
| | | | 370/329 |
| 2017/0095211 A1* | 4/2017 | Wang | A61B 5/721 |
| 2019/0327067 A1 | 10/2019 | Cox | |
| 2019/0349945 A1 | 11/2019 | Yeh et al. | |
| 2019/0357264 A1 | 11/2019 | Yi et al. | |
| 2022/0037775 A1 | 2/2022 | Yuan et al. | |
| 2022/0061085 A1 | 2/2022 | Zacharias et al. | |
| 2022/0116961 A1 | 4/2022 | Abotabl et al. | |

\* cited by examiner

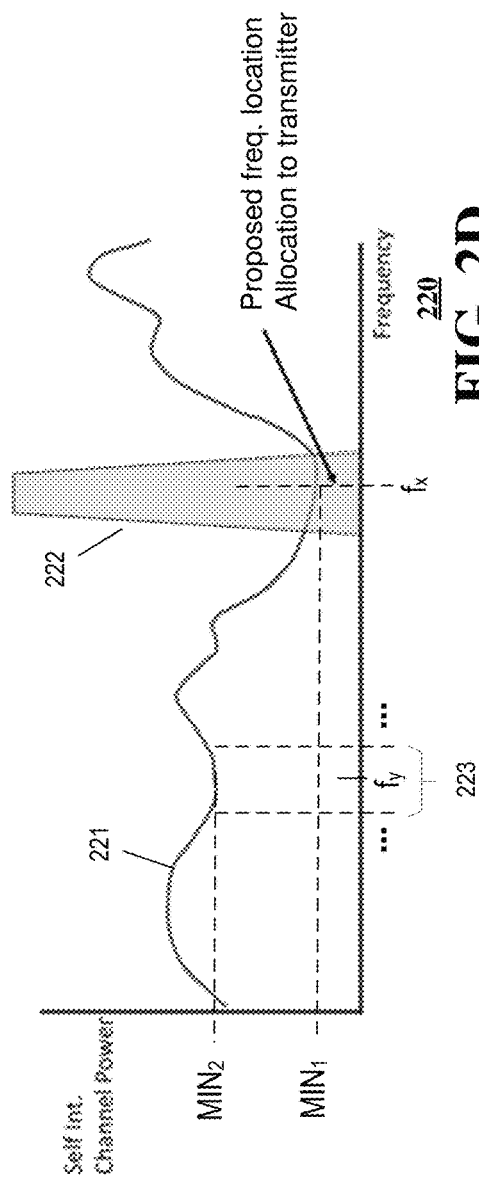
FIG. 2D
FIG. 2E
FIG. 2F

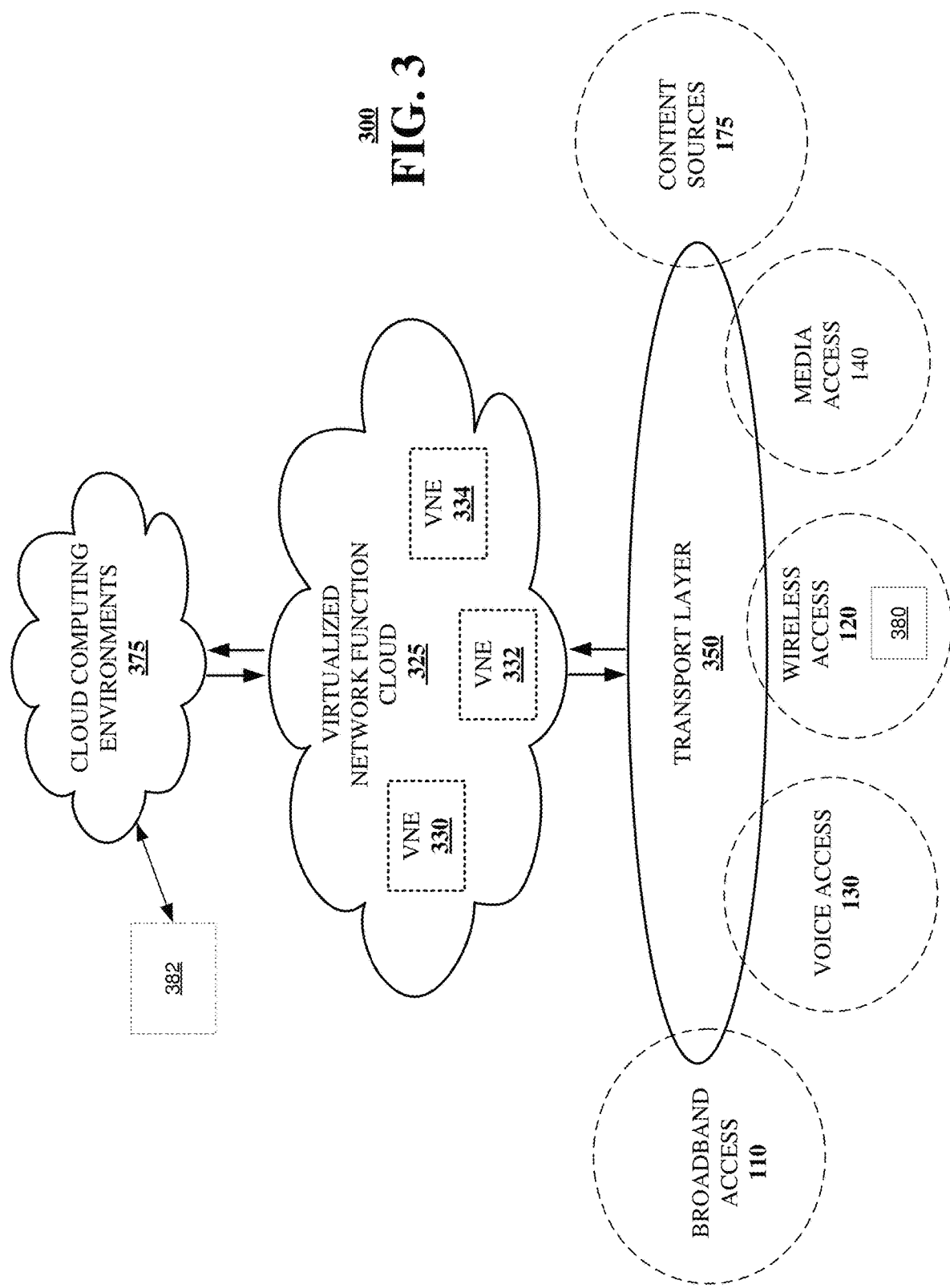

SUB-BAND SELECTION AT CELLULAR BASE STATION FOR NON-OVERLAPPED OR PARTIALLY OVERLAPPED FULL DUPLEX OPERATION

FIELD OF THE DISCLOSURE

The subject disclosure relates to a sub-band selection at cellular base station for non-overlapped or partially overlapped full duplex operation.

BACKGROUND

Full duplex operation in a radio frequency (RF) communication system allows a transceiver to transmit and receive wireless signals at the same time and within the same frequency band. During such operation the transceiver, e.g., a transceiver of a base-station, should ensure that its receiver is not overloaded with a signal transmitted by the base station itself, also known as self-interference.

For wireless communications, a local transmitter may communicate with a remote receiver, often over substantial distances. In such instances, the local transmitter may be adapted to provide a sufficiently high power level RF signal to overcome wireless link or path losses to a remote receiver. These link losses can be substantial, depending on separation distances, operational frequencies, obstructions and interference. For similar reasons, a local receiver may be adapted to receive weak or low power signals transmitted from a remote transmitter. A measure of the receiver's ability to detect a minimum received signal level may be referred to as the receiver's sensitivity.

Radio receivers subjected to unwanted RF signals, such as other nearby transmitters, may experience interference that can degrade performance. Receivers typically include amplifiers that operate to increase the receiver's sensitivity, e.g., permitting reception of relatively weak signals. In at least some applications, the receiver amplifiers are operated over their linear region, up to some maximum received power level. Signals received above the maximum received power level may drive the amplifier into nonlinear operation, e.g., producing unwanted interference, distortion and possibly damaging the device. Accordingly a receiver's range of operation may be described according to a dynamic range figure of merit, extending between the receiver's sensitivity and the maximum permissible power level. Unfortunately, a receiver portion of a transceiver may be compromised to at least some extent during full duplex transmission due to cross coupling, or self-interference between the transmitter and receiver.

BRIEF DESCRIPTION OF THE DRAWINGS

Reference will now be made to the accompanying drawings, which are not necessarily drawn to scale, and wherein:

FIG. 2D is graphical illustration of a sub-band selection measurement obtained for an example, non-limiting embodiment of a sub-band selection system functioning within the communication network of FIG. 1 in accordance with various aspects described herein.

FIG. 2E is graphical illustration of a receiver sensitivity adjustment for an example, non-limiting embodiment of a sub-band selection system functioning within the communication network of FIG. 1 in accordance with various aspects described herein.

FIG. 2F is graphical illustration of another receiver sensitivity adjustment for an example, non-limiting embodiment of a sub-band selection system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
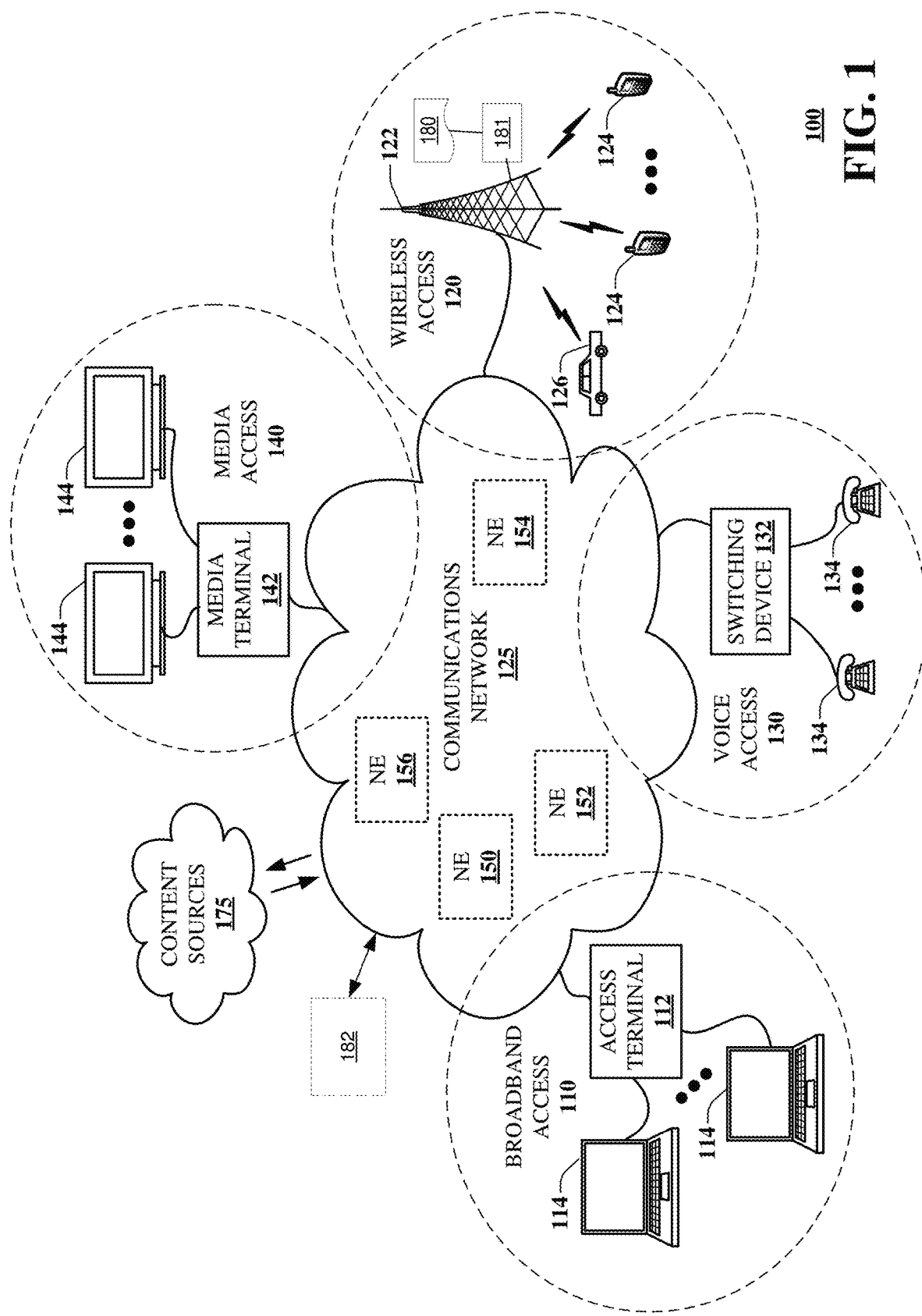
FIG. 1 is a block diagram illustrating an exemplary, non-limiting embodiment of a communications network in accordance with various aspects described herein.

The subject disclosure describes, among other things, illustrative embodiments for determining a self-interference channel response of a base station transceiver that spans multiple sub-bands of a predetermined mobile cellular frequency channel. A first sub-band is identified according to the self-interference channel response and an estimate is determined of a first coupled power level of a transmitter portion of the transceiver operating within the first sub-band. A sensitivity of a receiver portion of the transceiver is adjusted to increase receiver sensitivity, while also restricting operation of the receiver to a substantially linear region in view of the first coupled power level to support simultaneous transmission and reception within the same channel at the mobile base station. Other embodiments are described in the subject disclosure.

One or more aspects of the subject disclosure include a process that includes measuring, by a processing system including a processor, a self-interference channel response of a transceiver of a mobile base station including a transmitter and a receiver. The self-interference channel response spans multiple sub-bands of a predetermined mobile cellular frequency channel. The process further includes selecting, by the processing system, a first sub-band of the multiple sub-bands according to the self-interference channel response and calculating, by the processing system and at the receiver, an estimate of a first coupled transmit power level of the transmitter when operating within the first sub-band. The process further includes adjusting, by the processing system, a receive level of the receiver according to the first coupled transmit power level to obtain an adjustment adapted to increase receiver sensitivity, while restricting operation of the receiver to a substantially linear region, the adjustment allowing a transmission within the first sub-band and a reception within a second sub-band of the plurality of sub-bands to occur simultaneously at the mobile base station.

One or more aspects of the subject disclosure include a device that includes a processing system including a processor and a memory that stores executable instructions. The executable instructions, when executed by the processing system, facilitate performance of operations that include determining a self-interference channel response of a transceiver of a mobile base station having a transmitter and a receiver. The self-interference channel response spans multiple sub-bands of a predetermined mobile cellular frequency channel. The operations further include selecting a first sub-band of the multiple sub-bands according to the self-interference channel response and determining, at the receiver, an estimate of a first coupled transmit power level of the transmitter when operating within the first sub-band. A sensitivity of the receiver is reduced according to the first coupled transmit power level to maximum receiver sensitivity, while also maintaining operation of the receiver within a substantially linear region to permit simultaneous transmission within the first sub-band and reception within a second sub-band of the plurality of sub-bands at the mobile base station.

One or more aspects of the subject disclosure include a non-transitory, machine-readable medium that includes executable instructions. The executable instructions, when executed by a processing system including a processor, facilitate performance of operations that include determining a self-interference channel response of a transceiver of a mobile base station having a transmitter and a receiver. The self-interference channel response spans multiple sub-bands of a predetermined mobile cellular frequency channel. The operations further include identifying a first sub-band of the multiple sub-bands according to the self-interference channel response and determining, at the receiver, an estimate of a first coupled transmit power level of the transmitter when operating within the first sub-band. A receiver sensitivity is adjusted according to the first coupled transmit power level to obtain an adjustment adapted to increase receiver sensitivity, while restricting operation of the receiver to a substantially linear region, the adjustment allowing transmission within the first sub-band and reception within a second sub-band of the plurality of sub-bands to occur simultaneously at the mobile base station.

Referring now to FIG. 1, a block diagram is shown illustrating an example, non-limiting embodiment of a system 100 in accordance with various aspects described herein. For example, system 100 can facilitate in whole or in part determining a self-interference channel response of a base station transceiver that spans multiple sub-bands of a predetermined mobile cellular frequency channel. A first sub-band is identified according to the self-interference channel response and an estimate is determined of a first coupled power level of a transmitter portion of the transceiver operating within the first sub-band. A sensitivity of a receiver portion of the transceiver is adjusted to increase receiver sensitivity, while also restricting operation of the receiver to a substantially linear region in view of the first coupled power level to support simultaneous transmission and reception within the same channel at the mobile base station. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the access point 122 includes a transceiver 181 adapted for full-duplex operation. The transceiver may be adapted to implement one or more operations or instructions 180 to support full-duplex operation. For example, the operations may operate the transceiver 181 to determine a self-interference channel response as a measure of a portion of transmitter output coupled to a receiver input. It is envisioned that the self-interference channel response spans multiple sub-bands of a predetermined mobile cellular frequency channel in which the access point 122 is permitted to operate. The operations further include identifying a first sub-band of the multiple sub-bands according to the self-interference channel response and adjusting a receiver level to increase receiver sensitivity, while restricting operation of the receiver to a substantially linear region.

In at least some embodiments, the transceiver 181 may be in further communication with another system, such as a backend server 182 adapted to support full-duplex operation. The backend server 182 may include storage adapted to store one or more of previously obtained self-interference channel responses, previously obtained receiver level adjustments, and the like for one or more operational frequency bands and/or sub-bands. In at least some embodiments, the backend server 182 may provide a machine learning function adapted to support, e.g., predict, one or more of the self-interference channel response and/or the receiver level setting.

Figure 2A:
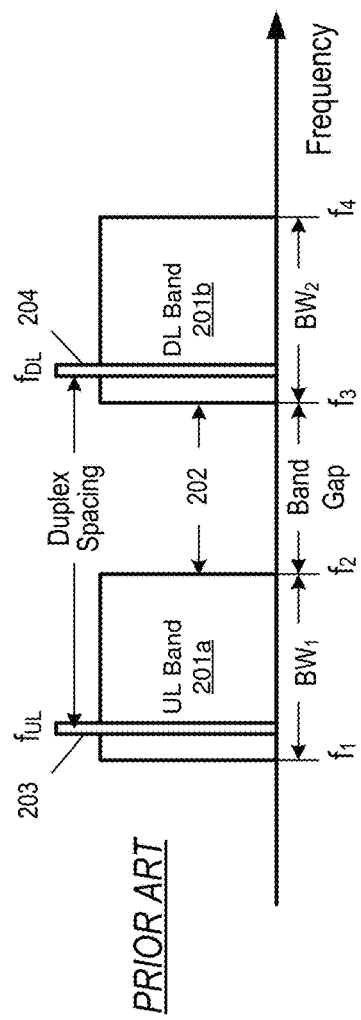
FIG. 2A is a graph illustrating an example frequency spectrum of band-separated, frequency division duplex operation.

FIG. 2A is a graph illustrating an example frequency spectrum 200 of band-separated, frequency division duplex operation. The example frequency spectrum 200 includes a first frequency band 201a extending from a first lower frequency, $f_1$, to a first upper frequency $f_2$, and a second frequency band 201b extending from a second lower frequency, $f_3$, to a second upper frequency $f_4$, wherein $f_4 > f_3 > f_2 > f_1$. The first frequency band 201a may correspond to an uplink frequency band, having a first bandwidth $BW_1$, which may be determined as a difference between the first upper and lower frequencies, i.e., $BW_1 = f_2 - f_1$. Likewise, the second frequency band 201b may correspond to a downlink band, having a second bandwidth $BW_2$, which may be determined as a difference between the second upper and lower frequencies, i.e., $BW_2 = f_4 - f_3$.

According to the illustrative example, the first and second frequency bands 201a, 201b may be separated by a predetermined frequency separation or spacing, sometimes referred to as a band gap 202, i.e., $f_3 - f_2$. According to frequency division duplex operation, separation of the uplink frequency, e.g., the first frequency band 201a from the downlink frequency, e.g., the second frequency band 201b, supports simultaneous uplink and downlink operations at a mobile base transceiver station, by ensuring a predetermined frequency separation between downlink transmissions from a transmitter portion of the base transceiver station and uplink receptions from a receiver portion of the base transceiver station. It is generally acknowledged that simultaneous operation of a transmitter and a collocated receiver adapted to receiver low power signals, e.g., from remote user equipment (UE), e.g., mobile devices, may adversely impact operation of the receiver. Namely, transmit power may couple into a front end of the receiver inducing non-linear effects that may introducing unwanted interference.

A frequency management plan that allocates distinct and different frequency bands that are dedicated to either transmit or receive operations may support duplex operations, in which transmission and reception may occur simultaneously, with the restriction that they operate in separate and distinct frequency bands, in which spectral separation may be ensured by imposing a minimum band gap between adjacent edges of either band. Even when distinct transmit and receive bands are utilized, however, it may be necessary to impose further restrictions by way of a duplex spacing. The example duplex spacing imposes a minimum frequency separation between an uplink reception $f_{UL}$ 203 and downlink transmission $f_{DL}$ 204 operations. According to the illustrative example, the duplex spacing is greater than the band gap, further restricting available frequencies for sub-band tuning.

Frequency division duplex (FDD) operation is standardized for mobile cellular communications according to "3$^{rd}$ Generation Partnership Project; Technical Specification Group Radio Access Network; Evolved Universal Terrestrial Radio Access (E-UTRA); User Equipment (UE) radio transmission and reception," 3GPP TS 36.101, v15.18.0 (2022 March). The example standard discloses an LTE Bands & Frequencies that support FDD operation. By way of example, LTE band number 1, includes an uplink band defined between 1850-1910 MHz and a downlink band defined between 1930-1990 MHz. The bandwidths are 60 MHz in either band, with a specified band gap of 20 MHz and a specified duplex spacing of 80 MHz. Each of the specified LTE bands may support permissible combinations of channel bandwidths, e.g., 1.4 MHz, 3 MHZ, 5 MHz, 10 MHz, 15 MHz and 20 MHz, with each having a corresponding number of resource blocks, e.g., 6, 15, 25, 50, 75 and 100 according to the example channel bandwidths, respectively.

Figure 2B:
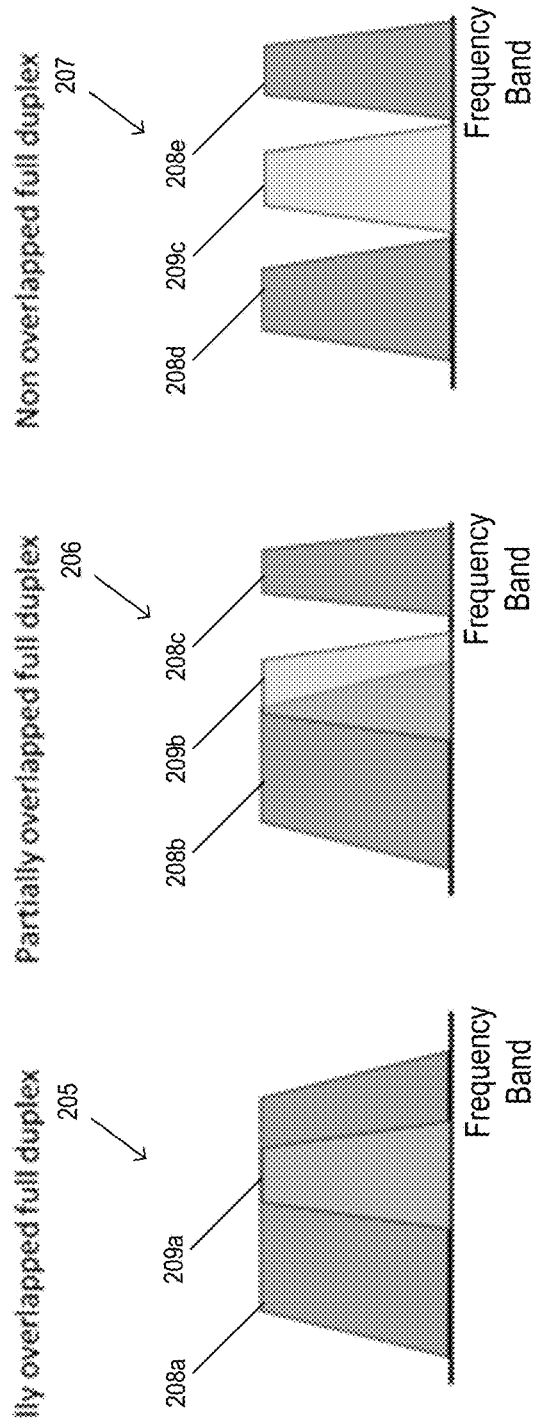
FIG. 2B are graphs illustrating example frequency spectra of sub-band, full duplex operation.

FIG. 2B provides graphs illustrating example frequency spectra of sub-band, full duplex operation. For example, a first example graph 205 illustrates an example of fully overlapped, full duplex operation. According to the first example graph 205, a first receiver band 208a allocated for receive operation is illustrated as a relatively wide trapezoid, while a first transmitter band 209a allocated for transmit operation, is illustrated as a relatively narrow trapezoid. In particular, the first transmitter band 209a completely overlaps the first receiver band 208a. A second example graph 206 illustrates an example of partially overlapped, full duplex operation. According to the second example graph 206, a first receiver band 208b and a second receiver band 208c are illustrated as separate, non-overlapping trapezoids of sizes that vary according to their respective bandwidths. The first and second receiver bands 208b, 208c are allocated for receive operation, while a first transmitter band 209b, also shown as a trapezoid is allocated for transmit operation. In particular, the first transmitter band 209b partially overlaps the first receiver band 208b, without fully overlapping it as in the first example graph 205. Likewise, a third example graph 207 illustrates an example of non-overlapped, full duplex operation. According to the third example graph 207, a first receiver band 208d and a second receiver band 208e are illustrated as separate, non-overlapping trapezoids of sizes that vary according to their respective bandwidths. The bands 208d, 208e are allocated for receive operation, while a first transmitter band 209c, also shown as a trapezoid is allocated for transmit operation. In particular, the first transmitter band 209c operates near the first and second receiver bands 208d, 208e, e.g., within the same LTE channel or band, without overlapping the first and second receiver bands 208d, 208e. The illustrative examples disclosed herein relate to scenarios similar to those portrayed in the example second and third graphs 206, 207, i.e., non-overlapping and/or partially overlapping transmit and receive bands.

Figure 2C:
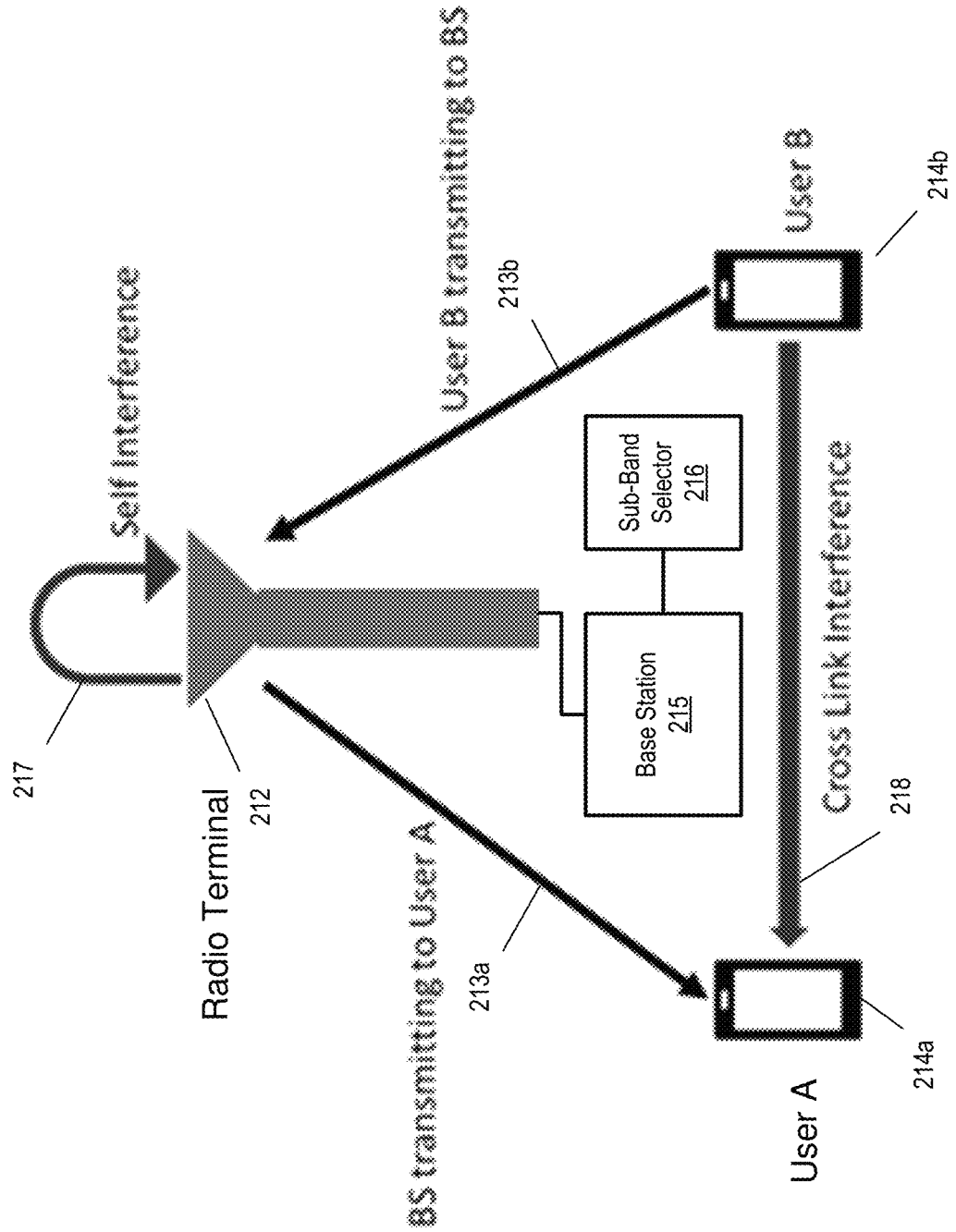
FIG. 2C is a block diagram illustrating an example, non-limiting embodiment of a full-duplex, sub-band selection system functioning within the communication network of FIG. 1 in accordance with various aspects described herein.

FIG. 2C is a block diagram illustrating an example, non-limiting embodiment of a full-duplex, sub-band selection system 210 functioning within the communication network of FIG. 1 in accordance with various aspects described herein. The example full-duplex, sub-band selection system 210 includes a radio terminal 212 in communication with a base transceiver station 215. The base transceiver station 215, in turn, is in communication with a sub-band selector 216. In operation, the radio terminal 212 includes a radio transmitter and a radio receiver that are adapted to support simultaneous transmit and receiver operation as may be directed by the base transceiver station 215. For example, the transmitter of the radio terminal 212 may transmit a downlink radio signal 213a to support wireless communications between the base transceiver station 215 and a first mobile communication device 214a. Similarly, the receiver of the radio terminal 212 may receive an uplink radio signal 213b to support wireless communications between a second mobile communication device 214b and the base transceiver station 215.

According to duplex operations, the radio terminal 212 may simultaneously support both the downlink radio signal 213a and the uplink radio signal 213b. It is understood that simultaneous operation of the downlink radio signal 213a and the uplink radio signal 213b may result in one or more forms of interference. For example, a self-interference 217 may include interference experienced at the receiver of the radio terminal 212, due to transmit operation of the transmitter of the radio terminal 212. Another form of interference is referred to as cross link interference 218, which may include interference experienced at a receiver of the first mobile communication device 214a, due to transmit operation of a transmitter of the second mobile communication device 214b.

It is understood that the example non-limiting embodiment of a full-duplex, sub-band selection system 210 may be adapted to operate in support of one or more mobile cellular communication services, such as those commonly referred to as 3G, 4G, 4G NR and 5G services. Operational aspects related to the example mobile cellular communication services may be disclosed, defined and/or otherwise standardized according to standards organizations, such as the 3GPP. Accordingly, it is understood that in at least some embodiments, downlink operation may utilize OFDM, with twelve (12) subcarriers arranged according to 180 kHz spacings. User and/or control data may be mapped into OFDM symbols, and provided as parallel sets of 12 OFDM symbols according to the 12 subcarriers of a physical resource block (PRB). For example, the OFDM symbols are mapped in each 0.5 msec time slot in groups of 7 symbols.

Although the example standards referred to herein generally describe FDD operation according to separately defined transmit and receive bands, it is understood that application of the techniques disclosed herein may be applied to permit duplex operation, without necessarily requiring a gap band between uplink and downlink bands, without necessarily requiring a minimum required duplex spacing, and in at least some embodiments, permitting duplex operation at the base transceiver station 215 and/or radio terminal 212, within the same defined band, e.g., within the same predefined uplink band, within the same predefined downlink band, and/or within both the predefined uplink and downlink bands. To that end, the sub-band selector 216 may operate alone, or in combination with one or more of the base transceiver station 215 and/or the radio terminal 212, to manage duplex operation within the same channel or band.

As disclosed in more detail below, the sub-band selector 216 may determine a characterization of the self-interference 217 at the radio terminal 212, according to one of an estimate, a measurement or both. The sub-band selector 216 may allocate transmit operation to one or more sub-bands of an operational frequency band, based on the characterization of the self-interference 217. Alternatively or in addition, the sub-band selector 216 may adjust an operational parameter of the receiver of the radio terminal 212, e.g., by adjusting one of a receiver gain, a receiver attenuation or both, responsive to the allocated transmit sub-band and the characterization of the self-interference 217. The sub-band selector 216 orchestrates duplex operation according to sub-bands that operate within the same operational frequency band, and in at least some embodiments, partially overlap on another.

FIG. 2D is graphical illustration of a sub-band selection measurement 220 obtained for an example, non-limiting embodiment of a sub-band selection system functioning within the communication network of FIG. 1 in accordance with various aspects described herein. According to the sub-band selection measurement 220, a self-interference power level is measured across a range of frequencies. The range of frequencies may correspond to a particular frequency band or bands of operation, such as a standardized mobile cellular channel or band, e.g., an LTE band, as specified in 3GPP TS 36.101. The measurements may be performed at multiple frequencies and/or frequency sub-bands across the entire frequency band, to provide some granularity, e.g., resulting in a curve, such as the example self-interference curve 221.

The self-interference channel power corresponds to a portion of an RF signal transmitted by a local or collocated transmitter that couples into a receiver, e.g., the receiver's RF front end. By way of example, and without limitation, the example self-interference curve 221 may be obtained by initiating test transmissions at a number of frequencies across the entire frequency band being evaluated. The transmissions may occur sequentially, e.g., at regular and/or irregularly spaced intervals. The intervals may correspond to sub-bands 223, e.g., with one or more RF signals being transmitted in each sub-band. The sub-bands 223 may be determined according to a channel spacing, e.g., 1.4 MHZ, 3 MHz, 5 MHz, 10 MHz, 15 MHZ and/or 20 MHz. Alternatively or in addition, the sub-bands 223 may be determined according to a PRB allocation.

In concert with the RF transmissions, the receiver may be monitored to identify received signals that correlates to the scheduled RF transmissions. The received RF power level and/or a difference between the transmitted and received RF power levels, e.g., in a form of a transfer function, may be characterized by the sub-band selection measurement 220. In many instances, the sub-band selection measurement 220 will demonstrate some variation in self-interference power level across the frequency band. Variations may be monotonic, or more likely, include relative maxima and/or minima across the frequency band as illustrated by the example self-interference curve 221.

Those regions of the example self-interference curve 221 demonstrating relatively low self-interference power levels indicate regions in which a lesser portion of the transmitter power couples into a front end of the receiver. Accordingly, such regions represent opportunities for tuning a transmitter, such that a relatively lower portion of the transmitted RF signal couples into the receiver. This takes advantage of a natural isolation as may be provided by one or more of the transceiver architecture, a local environment and/or other operational parameters. In the illustrative example, a minimum value occurs at a frequency $f_x$. A local transmitter may be tuned at or near $f_x$, such that when powered, it presents a transmitted spectrum 222 that occurs in a region of low coupling. Beneficially, a spacing of the transmitter at or near $f_x$ results in a relatively low self-interference power level. It is envisioned that in at least some instances, there may be more than one regions demonstrating relatively low self-interference power that may serve as alternative locations for tuning the transmitter, and/or for accommodating multiple transmitters operating within the same band.

It is understood that in at least some instances, environmental and/or other operational conditions may contribute to a shape of the example self-interference curve 221 and quite possibly to a corresponding location and/or number of favorable regions for tuning any collocated transmitter(s). To account for such variations, the self-interference power curve may be evaluated and later reevaluated. Such reevaluations may occur periodically, e.g., according to a predetermined schedule, e.g., hourly, daily, weekly, and so on. Alternatively or in addition, reevaluations of the example self-interference 221 may occur according to a schedule of opportunity, e.g., being performed/repeated during periods of low activity. In at least some embodiments, the self-interference power curve may be reevaluated piecewise, e.g., updating one or more portions of the curve according to a schedule and/or during periods of opportunity.

It is envisioned that in at least some embodiments, the example self-interference curve 221 may vary according to certain environmental factors and/or operational conditions. Accordingly, there may be some common features that occur and/or change in response to the environmental factors and/or operational conditions. Consequently, there may be some regularity, e.g., according to time of day and/or day of week, or according to some observable condition, such as operational conditions, network congestion, numbers of users, frequency bands, and the like.

In at least some embodiments, the self-interference power curves may be maintained, e.g., in a history log and/or database. To the extent that fluctuations in the example self-interference curve 221 may be correlated to times, days and/or any other conditions, the previously stored curves may be recalled and utilized as conditions change, without necessarily having to repeat an entire self-interference measurement. The history logs or database may be updated periodically, e.g., in a similar manner as described above, to improve, refine and/or adapt historical records, thereby improving and/or maintaining their relevance over extended periods of time.

It is envisioned that in at least some embodiments, measurements to obtain and/or otherwise update the example self-interference power 221 may be initiated responsive to events or conditions. For example, if a predetermined curve is used, and a local transmitter tuned to a minimum, or relative minimum frequency $f_x$, but later found to be inadequate for receiver operation according to full duplex operation, the transmitter may be tuned to another relative minimum frequency, e.g., frequency $f_y$. Alternatively or in addition, if a relative minimum frequency $f_x$ is found to be inadequate for receiver operation according to full duplex operation, the self-interference power curve may be revised, e.g., responsive to the determination. Such changes in locations and/or minimum coupling values may vary with environmental conditions, such that a reevaluation of the example self-interference power curve 221 may be prompted by such changes.

FIG. 2E is graphical illustration of a receiver sensitivity adjustment 225 for an example, non-limiting embodiment of a sub-band selection system functioning within the communication network of FIG. 1 in accordance with various aspects described herein. According to the example, a transmitter is tuned to a frequency of minimum and/or relative minimum coupling, e.g., $f_x$ or $f_y$. The transmitter spectrum 228 may couple into a front end of the receiver approximated by the trapezoidal shape and having a coupled maximum power level 229. Also shown for comparison is a full duplex received signal spectrum, e.g., a received uplink signal 226, adjacent to a coupled portion of the transmitter spectrum 228, e.g., from a downlink signal, approximated by its trapezoidal shape and having a maximum value 227.

Also illustrated are a receiver reference level 230a, a receiver sensitivity 232a and a dynamic range 234a. The receiver reference level 230a may represent an adjusted level of the receiver, such that operation below the receiver reference level 230a ensures that the receiver operates within a substantially linear region. According to the illustrative example, the receiver reference level 230a may be adjusted responsive to the coupled maximum power level 229 of the downlink signal. Namely, the coupled maximum power level 229 may be at or below the receiver reference level 230a to ensure that the coupled maximum power level 229 does not introduce interference, e.g., harmonics, intermodulation and/or other spurious effects.

The receiver sensitivity 232a may vary according to adjustment of the receiver reference level 230a. For example, the receiver sensitivity 232a may be estimated by subtracting the receiver's dynamic range 234a from the adjusted receiver reference level 230a. As the adjusted receiver reference level is increased, the receiver sensitivity 232a may increase in a like manner, effectively maintaining separation according to the dynamic range 234a.

In at least some embodiments, the receiver sensitivity 232a should be adjusted to ensure that the receiver is adapted to receiver a minimum received signal level. For example, the received uplink signal 226 maximum power level 227 should be at or above the receiver sensitivity 232a, e.g., by some specified amount. The amount above the receiver sensitivity 232a may be specified, e.g., according to a signal-to-noise ratio (SNR), a signal-plus-interference-to-noise ration (SINAR), and the like. To the extent that the coupled maximum power level 229 is sufficiently high to permit an adjustment that accommodates the received uplink signal 226, it is understood that at least some compromises may be made. For example, referring to FIG. 2F, a readjusted receive reference level 230b may be adjusted below the coupled maximum power level 229 (FIG. 2E), to effectively lower the receiver sensitivity 232b below the maximum power level 227 of the received uplink signal 226.

Figure 2G:
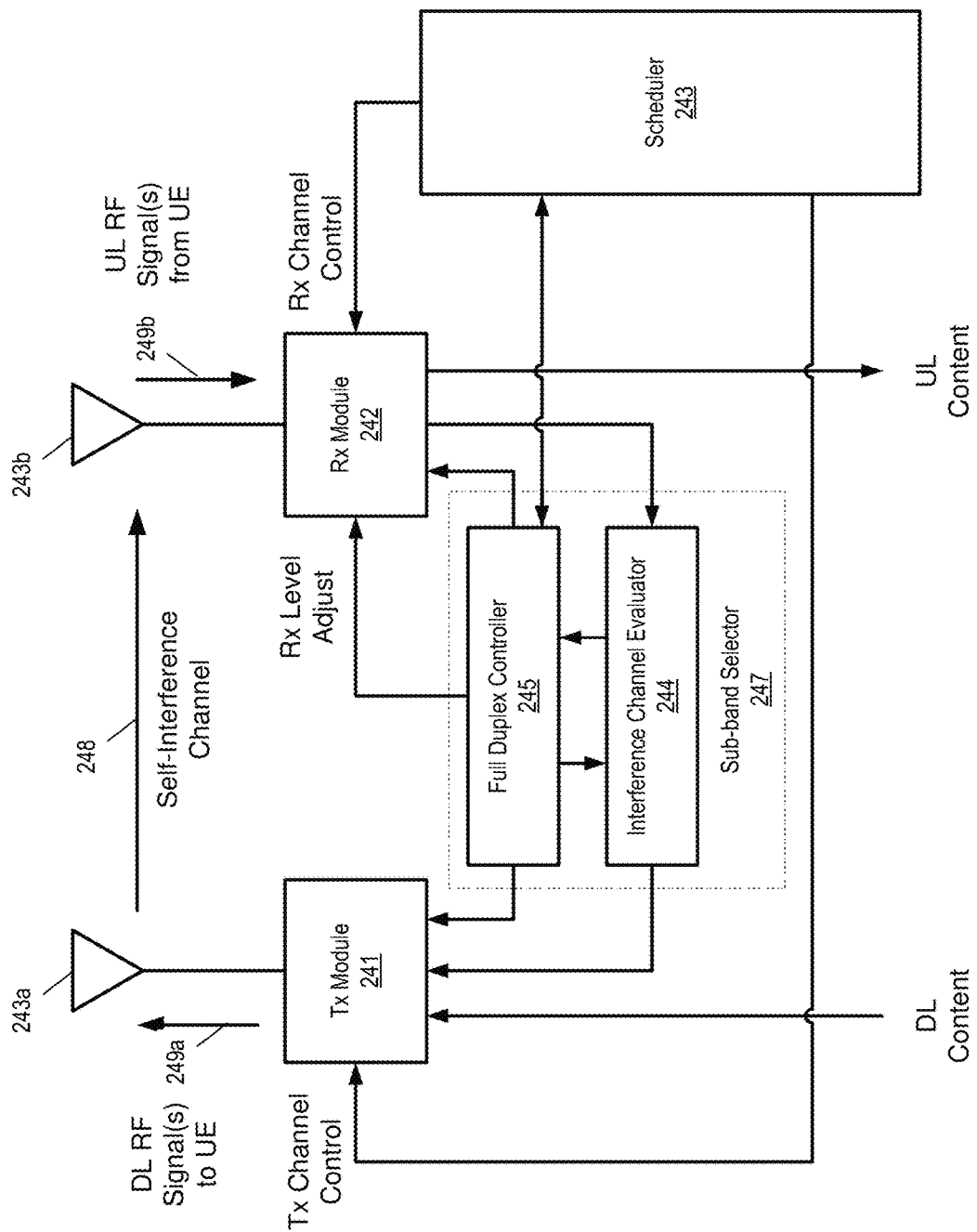
FIG. 2G is a block diagram illustrating an example, non-limiting embodiment of a transceiver functioning within the communication network of FIG. 1, and equipped with a sub-band selection system in accordance with various aspects described herein.

FIG. 2G is a block diagram illustrating an example, non-limiting embodiment of a mobile cellular communications transceiver 240 functioning within the communication network of FIG. 1, and equipped with a sub-band selection system in accordance with various aspects described herein. The transceiver includes a transmitter module 241 in communication with a transmit antenna 243a and a receiver module 242 in communication with a receiver antenna 243b. In operation the transmitter module 241 receives downlink content and encodes the downlink content onto a PRB, e.g., utilizing OFDM, according to a schedule provided by a scheduler 243. The encoded downlink data is impressed onto a downlink RF signal that is transmitted wireless to one or more UE (not shown) via the transmit antenna 243a.

Similarly, the receiver module 242 receives RF uplink signals from one or more UE devices. The uplink signals include uplink content encoded onto the uplink, e.g., utilizing single-carrier OFDM (SC-OFDM). The encoded uplink content is impressed onto an RF uplink signal by the UE devices and transmitted wirelessly and received via the receiver antenna 243b at the mobile cellular communications transceiver 240, e.g., of a base station. The receiver module 242 extracts the uplink content from the received RF uplink signal, e.g., in cooperation with the scheduler 243, providing the uplink content to other system elements (not shown), e.g., for further processing and/or transport to other devices and/or systems. In at least some embodiments, a single antenna system may serve as both the transmit antenna 243a and the receiver antenna 243b.

A self-interference channel 248 is illustrated as a line drawn between the transmit antenna 243a and the receiver antenna 243b. The self-interference channel 248 corresponds to a coupling of a transmitted RF signal, e.g., a downlink (DL) RF signal 249a into a front end of the receiver module 242. According to the self-interference channel 248, a portion of the DL RF signal 249a may couple into a front end of the receiver module 242 in combination with an uplink (UL) RF signal 249b, also present at the front end of the receiver module 242. The actual coupling mechanisms that give rise to the self-interference channel 248 may include one or more of antenna-to-antenna coupling, cable-to-cable coupling, internal device coupling, reflections from environmental objects, and so on.

The mobile cellular communications transceiver 240 is adapted to identify the self-interference channel 248. In at least some embodiments, identification may be characterizing the self-interference channel 248 and/or estimating the self-interference channel 248. Characterization may be obtained via measurement of a self-interference power level. In at least some embodiments, the self-interference channel 248 may be identified, at least in part, by access to a reference self-interference channel, such as an interference channel obtained for a similarly configured mobile cellular communications transceiver 240 and/or from previously obtained self-interference channel 248 for the mobile cellular communications transceiver 240. Alternatively or in addition, the mobile cellular communications transceiver 240 may be configured to adapt operation of one or more of the transmitter module 241 and the receiver module 242 to accommodate full-duplex operation in view of the self-interference channel 248.

By way of non-limiting example, the illustrative example mobile cellular communications transceiver 240 includes a sub-band selector module 247. The sub-band selector module 247 is in communication with one or more of the transmitter module 241 and the receiver module 242, and adapted to identify the self-interference channel 248 and to further identify therewithin, one or more areas of relatively low-levels of self-interference. The sub-band selector module 247 may identify and/or otherwise select, e.g., from the self-interference channel 248, one or more transmitter sub-bands available within a predetermined channel bandwidth, such that self-interference due to the transmitted DL RF signal 249a is relatively low at the receiver module 242.

In at least some embodiments, the sub-band selector module 247 may be adapted to adjust operation of the receiver module 242 according to sub-band selection in view of the self-interference channel 248. Adjustment of the receiver module 242 may include adjusting a receiver operational level, e.g., by varying one of a receiver gain, a receiver attenuation, or both. The operational level may adjust a receiver sensitivity and/or a non-linear performance threshold, e.g., in view of a coupled interfering portion of the transmitter module 241. For example, the receive adjustment may be configured to maintain operation of the receiver within a substantially linear region, while also establishing a relatively low receiver sensitivity level.

By way of nonlimiting illustration, the sub-band selector module 247 may include a full-duplex controller 245 and an interference channel evaluator 244. The full-duplex controller 245 may be in communication with one or more of the interference channel evaluator 244, the transmitter module 241, the receiver module 242 and the scheduler 243. Likewise, the interference channel evaluator 244 may be in communication with one or more of the full-duplex controller 245, the transmitter module 241, and the receiver module 242.

In at least some embodiments, the full-duplex controller 245 may initiate configuration of the mobile cellular communications transceiver 240 for full-duplex operation. Full-duplex operation may include operation of collocated transmitter and receiver within a common operational frequency band, including any of the example frequency bands disclosed herein. In at least some instances, full-duplex operation includes a transmitter operating within a transmit sub-band and a receiver contemporaneously operating within a receive sub-band. The transmit and receive sub-bands both reside within the common operational frequency band. Full-duplex operation may be supported when the transmit and receive bands are not overlapping, e.g., adjacent to each other and/or separated by one or more interstitial sub-bands. In at least some embodiments, full-duplex operation may be supported within the transmit and receive bands are at least partially overlapping, e.g., immediately adjacent sub-channels, and/or sub-channels that at least partially overlap.

In operation, the full-duplex controller 245 may request an evaluation of the self-interference channel 248 from the interference channel evaluator 244. In at least some embodiments, the request may identify one or more operational frequency bands of interest, for which the self-interference channel should be provided. Frequency band selection may be determined by the full-duplex controller 245 according to one or more of available licensed frequency bands, operational capabilities of the mobile cellular communications transceiver 240 and/or the UE devices. Alternatively or in addition, frequency band selection may be determined by an application to be supported by the DL RF signal 249a and/or the UL RF signal 249b, and/or by a level of subscription, a number, type and/or distances to UE devices, network conditions, environmental conditions, and so on.

The interference channel evaluator 244 may direct and/or otherwise request that the transmitter module 241 provide RF transmissions across the operational frequency band to be evaluated. To this end, the interference channel evaluator 244 may tune the transmitter directly, e.g., transmitting a test signal, such as a test tone. Alternatively or in addition, the interference channel evaluator 244 may request that the scheduler 243 schedule one or more PRBs, such that transmission of the scheduled PRBs may serve as a self-interference source signal. Likewise, the interference channel evaluator 244 may direct and/or otherwise request that the receiver module 242 tune to and/or otherwise measure a portion of the transmitted signal coupled to the receiver module 242. The receiver measurements may be performed across the operational frequency band to be evaluated, e.g., tracking a tuning of the transmitter module 241 and/or scheduled PRBs. To this end, the interference channel evaluator 244 may tune the receiver directly, e.g., receiving a coupled portion of the test signal, such as the example test tone. Alternatively or in addition, the interference channel evaluator 244 may request that the scheduler 243 schedule one or more PRBs, such that reception of the scheduled PRBs may serve as a received measure of the self-interference source signal.

In some embodiments, the interference channel evaluator 244 may initiate and/or otherwise update a measurement of the self-interference channel 248, responsive to a request for full-duplex operation, such as the example request received from the full-duplex controller 245. Alternatively or in addition, the interference channel evaluator 244 may be adapted to obtain and/or otherwise update a characterization of the self-interference channel 248 according to a schedule and/or periods of opportunity and/or according to any of the other example scenarios disclosed herein.

One or both of the full-duplex controller 245 and the interference channel evaluator 244 may be configured to evaluate the characterization, e.g., measurement, of the self-interference channel 248. The evaluation may identify one or more sub-bands displaying favorable locations for sub-band, full-duplex operation of one or more of the transmitter module 241 and the receiver module 242. For example, the evaluation may identify a sub-channel having the overall lowest value of the characterized self-interference channel 248, or a relatively low value, e.g., according to a relative minimum.

The full-duplex controller 245, having identified a target sub-band for the transmitter module 241, may provide a control input to one or more of the transmitter module 241 and/or the scheduler 243 to provide a test signal and/or to initiate transmit operations, e.g., the DL RF signal 249a, using the target sub-band. Similarly, the full-duplex controller 245 may provide a receiver level adjustment control input to the receiver module, e.g., to adjust the receiver level in view of a coupled portion of the DL RF signal 249a coupled to a front end of the receiver module according to the self-interference channel.

In at least some embodiments, a receiver operational level may be determined according to a calculation. For example, a transmitter power level setting may be offset by a coupling value of a self-interference channel 248 to estimate a corresponding power level of the DL RF signal 249a coupled to the front end of the receive module, without actually having to initiate a transmission of the DL RF signal 249a. Alternatively or in addition, a test signal, e.g., at test tone and/or a test data pattern, may be provided to the transmitter module 241 by the full-duplex controller 245 and/or the under a control of the scheduler 243. The transmitter module 241 may transmit the test pattern, while the receiver module is monitored to evaluate a performance aspect in view of the self-interference channel 248. The performance aspect may include one or more of a received power level, a measure of nonlinearity, e.g., a third-order performance or intercept, a receiver sensitivity and/or a receiver dynamic range.

Having suitably configured operation of the transmitter module 241 according to the selected sub-band and operation of the receiver module 242 in view of the self-interference related to the DL RF signal 249a, the mobile cellular communications transceiver 240 may initiate and/or maintain full-duplex operation.

Figure 2H:
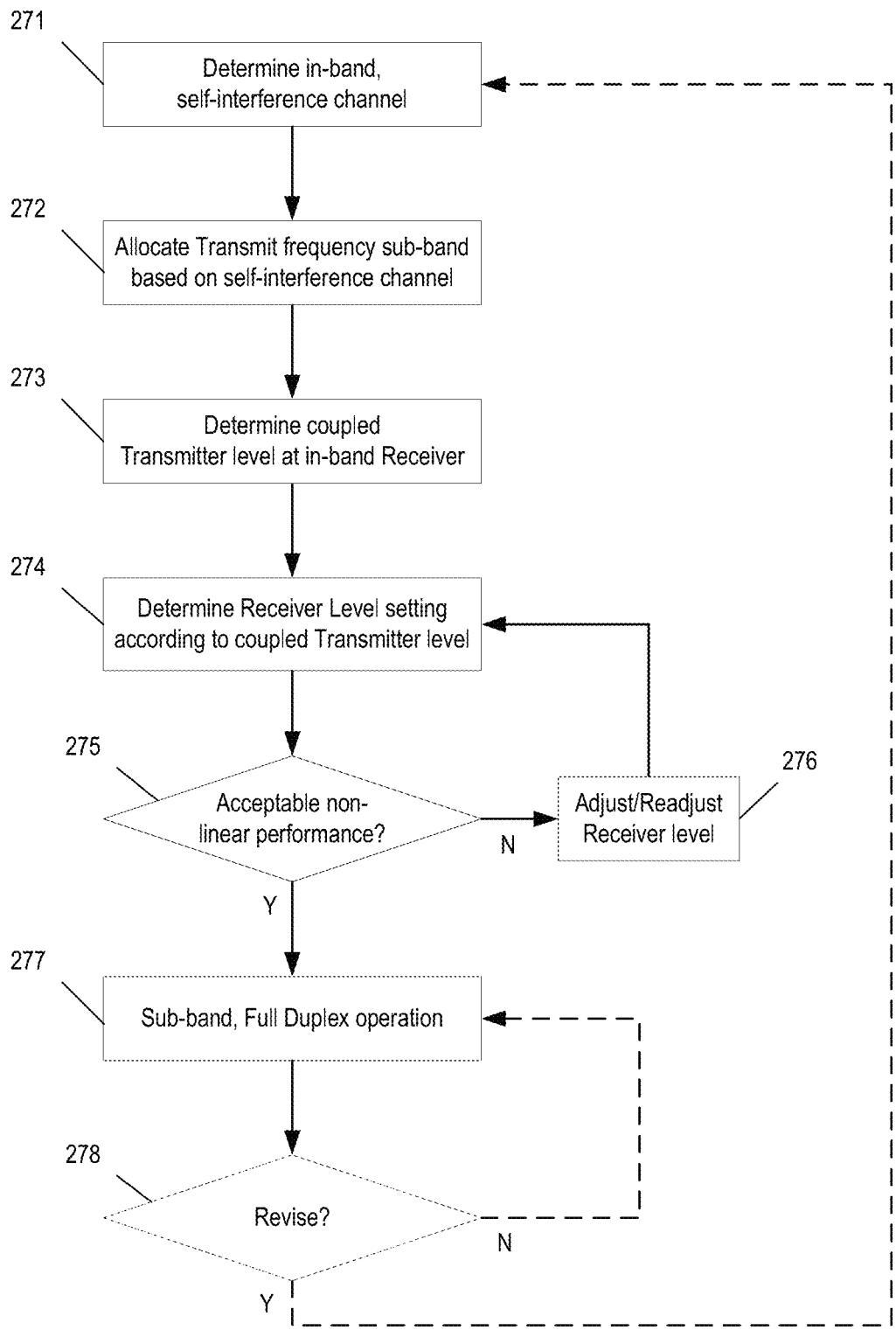
FIG. 2H depicts an illustrative embodiment of a sub-band selection process for in-band frequency duplex operation in accordance with various aspects described herein.

FIG. 2H depicts an illustrative embodiment of a sub-band selection process 270 for in-band frequency duplex operation in accordance with various aspects described herein. According to the illustrative sub-band selection process 270, an in-band, self-interference channel is determined at 271. The self-interference channel may be determined according to any of the various techniques disclosed herein, such as performing a measurement that measures a portion of a transmitted signal coupled to the receiver. Other examples include, without limitation, obtaining an indication of the self-interference channel from a similarly configured system, and/or from a previous measurement and/or from an estimation.

In at least some embodiments, machine learning may be applied. For example, an artificial intelligence (AI) module may be trained to recognize a self-interference channel response based on certain inputs, such as an operational frequency and/or frequency range, a sub-band frequency and/or bandwidth, received UL signal levels and/or bandwidths, environmental conditions, time of day, day of week, and the like. The AI module, once suitably trained, e.g., according to a training set, may be employed to predict a favorable sub-band. Alternatively or in addition, the AI module may be trained to recognized receiver level adjustments or settings according to transmitter operational power levels and/or sub-band width and/or frequency range. Once trained, the AI module may be employed to predict a receiver level adjustment give operational parameters of the collocated transmitter, e.g., its power level and/or sub-band width and/or frequency range.

According to the illustrative sub-band selection process 270, a transmit frequency sub-band is allocated at 272 based on self-interference channel. Allocation of the sub-band may be based on one or more of an absolute minimum value and/or relative minimum value(s) in the self-interference channel 248, bandwidth(s) and/or frequency range(s) of receiver sub-band and/or sub-bands, application(s) supported by the full-duplex communications, subscription levels, channel availability, channel assignments, and so on.

A coupled transmitter level at an in-band receiver is determined at 273. The coupled transmitter level may be determined according to any of the illustrative techniques disclosed herein and/or otherwise generally known to those skilled in the art. For example, the transmitter power level may be measured directly and/or calculated, e.g., based on a transmit power level and a measure of a coupling, e.g., a transfer function, between the transmitter and a front end of the receiver.

A receiver level setting is determined at 274 according to coupled transmitter level. The receiver level setting may adjust one or more of a receiver gain or an attenuation. The receiver level setting may be determined according to any of the illustrative techniques disclosed herein and/or otherwise generally known to those skilled in the art. For example, the receiver level setting may be based upon a measurement and/or a calculation of a portion of the transmitted signal, e.g., at a measured and/or otherwise known power level, coupled to the front end of the receiver. Alternatively or in addition, the receiver level setting may be based upon an interference measurement, e.g., monitoring a variation in interference levels compared to variation in receiver level setting, e.g., according to a third-order intercept figure of merit.

A determination is made at 275 as to whether the non-linear performance is acceptable. Such a determination may be made for any suitable reason, e.g., that the receiver level adjustment may be capable of assuring substantially linear operation of the receiver, while also providing a receiver sensitivity suitably low to accommodate UE devices at a cell edge, with an acceptable level of performance.

To the extent it is determined at 275 that the non-linear performance is not acceptable, an adjustment and/or readjustment of the receiver level may be initiated at 276. After adjusting and/or readjusting the receiver level, the sub-band selection process 270 proceed proceeds to repeat determining the receiver level setting at 274 according to a revised transmitter level.

To the extent it is determined at 275 that the non-linear performance is acceptable. The sub-band selection process 270 proceeds to establish and/or otherwise support full-duplex operation at 277.

In at least some embodiments, a determination is made at 278 (shown in phantom) as to whether a configuration of a transceiver for full-duplex should be revised and/or otherwise revisited. To the extent it is determined at 278 that revision is unnecessary, the sub-band selection process 270 continues to establish and/or otherwise support full-duplex operation at 277. However, to the extent it is determined at 278 that a reconfiguration of the transceiver for full-duplex operation should be revise and/or otherwise revised, the sub-band selection process 270 repeats from step 271, e.g., determining an in-band, self-interference channel and so on.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part determining a self-interference channel response of a base station transceiver that spans multiple sub-bands of a predetermined mobile cellular frequency channel. A first sub-band is identified according to the self-interference channel response and an estimate is determined of a first coupled power level of a transmitter portion of the transceiver operating within the first sub-band. A sensitivity of a receiver portion of the transceiver is adjusted to increase receiver sensitivity, while also restricting operation of the receiver to a substantially linear region in view of the first coupled power level to support simultaneous transmission and reception within the same channel at the mobile base station.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In at least some embodiments, the wireless access 120 includes a transceiver 380 adapted for full-duplex operation. The transceiver 380 may be adapted to implement one or more operations or instructions to support full-duplex operation. For example, the operations may operate the transceiver 380 to determine a self-interference channel response as a measure of a portion of transmitter output coupled to a receiver input. It is envisioned that the self-interference channel response spans multiple sub-bands of a predetermined mobile cellular frequency channel in which the wireless access 120 is permitted to operate. The operations further include identifying a first sub-band of the multiple sub-bands according to the self-interference channel response and adjusting a receiver level to increase receiver sensitivity, while restricting operation of the receiver to a substantially linear region.

In at least some embodiments, the transceiver 380 may be in further communication with another system, such as a backend server 382 adapted to support full-duplex operation. The backend server 382 may be implemented in whole or in part withing the cloud computing environment 275. The backend server 382 may be adapted to include storage configured to store one or more of previously obtained self-interference channel responses, previously obtained receiver level adjustments, and the like for one or more operational frequency bands and/or sub-bands. In at least some embodiments, the backend server 382 may provide a machine learning function adapted to support, e.g., predict, one or more of the self-interference channel response and/or the receiver level setting.

Figure 4:
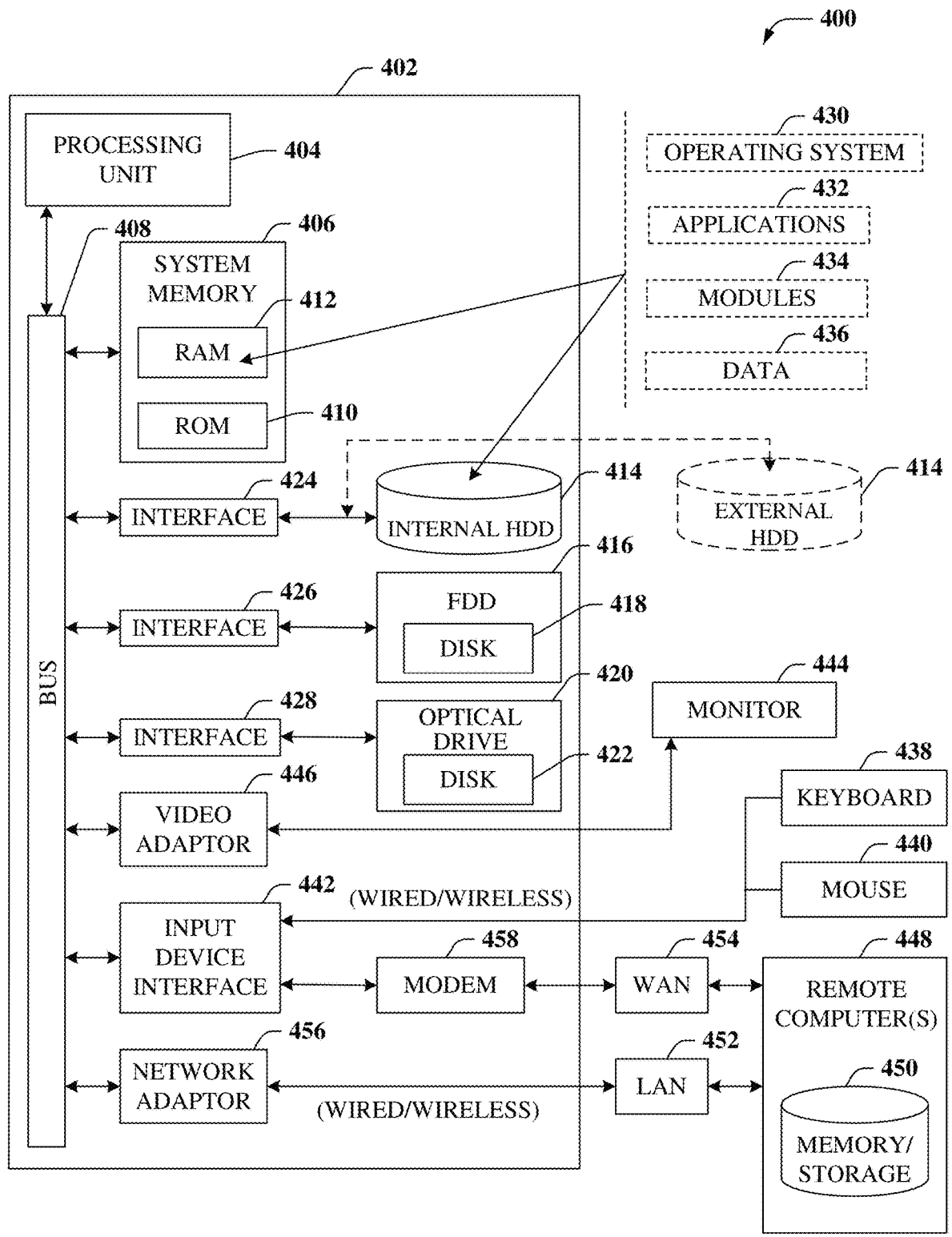
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a self-interference channel response of a base station transceiver that spans multiple sub-bands of a predetermined mobile cellular frequency channel. A first sub-band is identified according to the self-interference channel response and an estimate is determined of a first coupled power level of a transmitter portion of the transceiver operating within the first sub-band. A sensitivity of a receiver portion of the transceiver is adjusted to increase receiver sensitivity, while also restricting operation of the receiver to a substantially linear region in view of the first coupled power level to support simultaneous transmission and reception within the same channel at the mobile base station.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
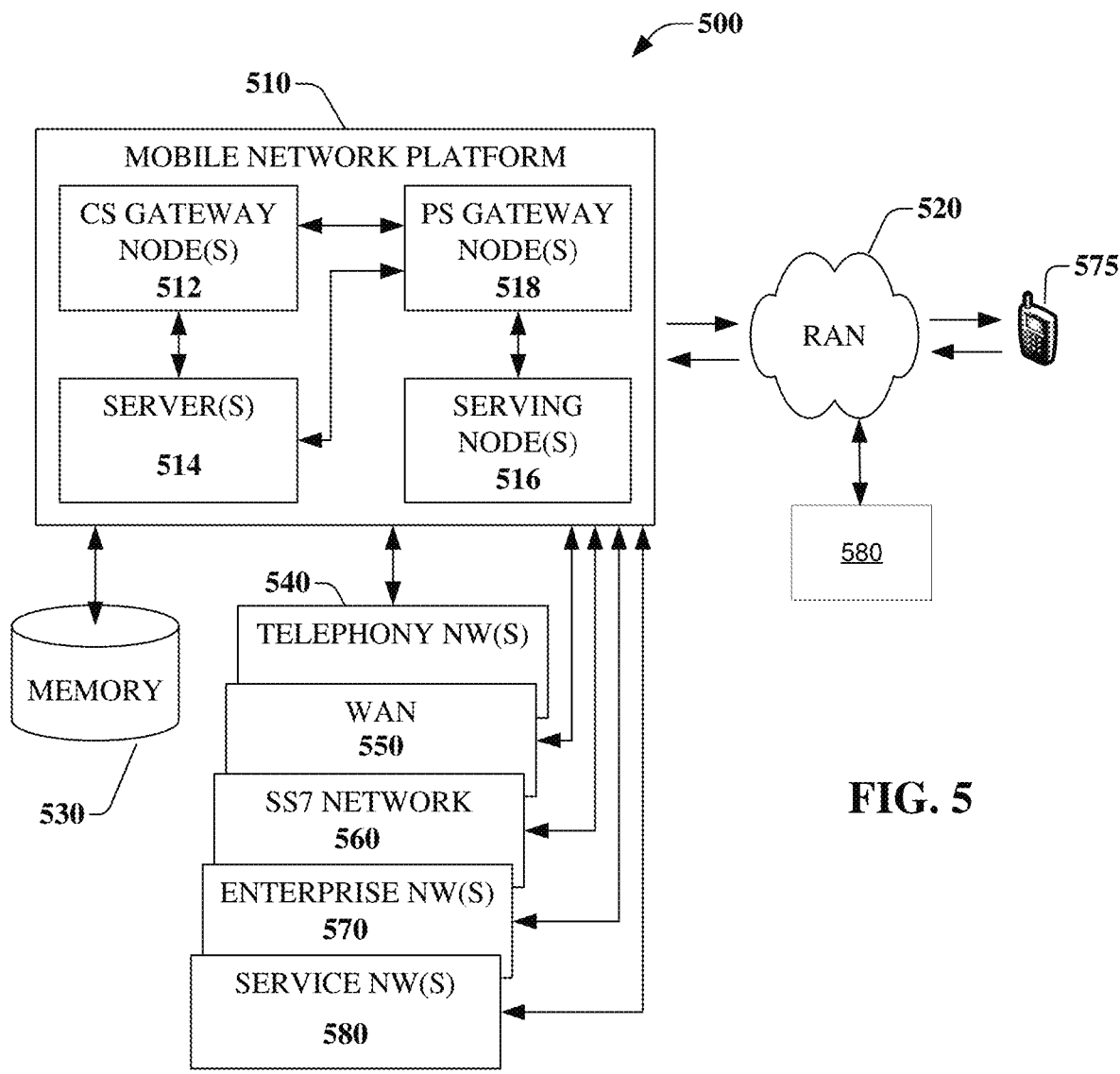
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a self-interference channel response of a base station transceiver that spans multiple sub-bands of a predetermined mobile cellular frequency channel. A first sub-band is identified according to the self-interference channel response and an estimate is determined of a first coupled power level of a transmitter portion of the transceiver operating within the first sub-band. A sensitivity of a receiver portion of the transceiver is adjusted to increase receiver sensitivity, while also restricting operation of the receiver to a substantially linear region in view of the first coupled power level to support simultaneous transmission and reception within the same channel at the mobile base station. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the wireless RAN 520 includes a transceiver 582 adapted for full-duplex operation. The transceiver 582 may be adapted to implement one or more operations or instructions to support full-duplex operation. For example, the operations may operate the transceiver 582 to determine a self-interference channel response as a measure of a portion of transmitter output coupled to a receiver input. It is envisioned that the self-interference channel response spans multiple sub-bands of a predetermined mobile cellular frequency channel in which the RAN 520 is permitted to operate. The operations further include identifying a first sub-band of the multiple sub-bands according to the self-interference channel response and adjusting a receiver level to increase receiver sensitivity, while restricting operation of the receiver to a substantially linear region.

Figure 6:
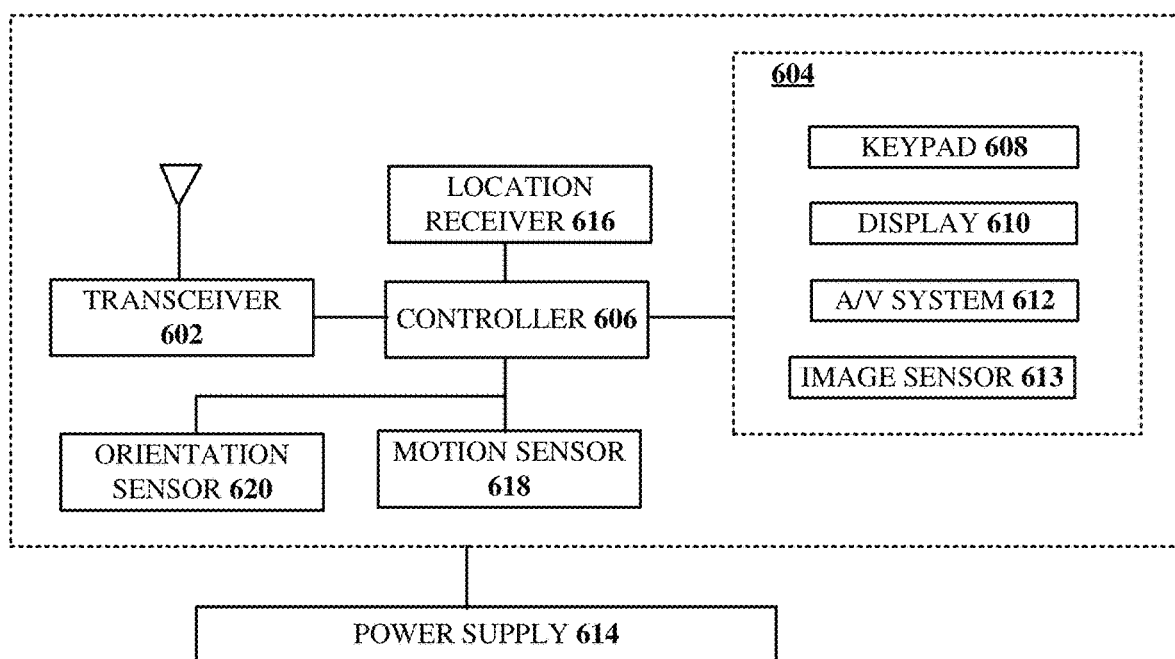
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a self-interference channel response of a base station transceiver that spans multiple sub-bands of a predetermined mobile cellular frequency channel. A first sub-band is identified according to the self-interference channel response and an estimate is determined of a first coupled power level of a transmitter portion of the transceiver operating within the first sub-band. A sensitivity of a receiver portion of the transceiver is adjusted to increase receiver sensitivity, while also restricting operation of the receiver to a substantially linear region in view of the first coupled power level to support simultaneous transmission and reception within the same channel at the mobile base station.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   measuring, by a processing system including a processor, a self-interference channel response of a transceiver of a mobile base station comprising a transmitter and a receiver, wherein the self-interference channel response spans a plurality of sub-bands of a predetermined mobile cellular frequency channel;
   selecting, by the processing system, a first sub-band of the plurality of sub-bands according to the self-interference channel response;
   calculating, by the processing system and at the receiver, an estimate of a first coupled transmit power level of the transmitter when operating within the first sub-band; and
   adjusting, by the processing system, a receive level of the receiver according to the first coupled transmit power level to obtain an adjustment adapted to increase receiver sensitivity, while restricting operation of the receiver to a substantially linear region, the adjustment allowing a transmission within the first sub-band and a reception within a second sub-band of the plurality of sub-bands to occur simultaneously at the mobile base station.

2. The method of claim 1, wherein the selecting the first sub-band further comprises:
   determining, by the processing system, a target region of the self-interference channel response having a self-interference channel response comparatively lower than another region of the self-interference channel response; and
   associating, by the processing system, the first sub-band with the target region.

3. The method of claim 2, wherein the calculating the estimate of the first coupled transmit power level further comprises:
   determining, by the processing system, a transmit power level of the transmitter; and calculating, by the processing system, the first coupled transmit power level according to the transmit power level and the self-interference channel response of the target region.

4. The method of claim 1, wherein each sub-band of the plurality of sub-bands accommodates a group of resource blocks determined according to an application of orthogonal frequency division multiplexing (OFDM).

5. The method of claim 1, wherein the first sub-band at least partially overlaps the second sub-band at the mobile base station.

6. The method of claim 1, further comprising:
selecting, by the processing system, a third sub-band of the plurality of sub-bands according to the self-interference channel response;
calculating, by the processing system and at the receiver, a second coupled transmit power level of the transmitter operating within the third sub-band; and
adjusting further, by the processing system, the receive level of the receiver according to the first and second coupled transmit power levels to obtain the adjustment allowing a transmission within the first and third sub-bands and a reception within the second sub-band to occur simultaneously at the mobile base station.

7. The method of claim 1, further comprising:
determining, by the processing system, a non-linear figure of merit of the receiver, wherein the adjusting the receive level of the receiver occurs according to the non-linear figure of merit and the estimate of the first coupled transmit power level.

8. The method of claim 1, wherein the adjusting of the receive level further comprises adjusting, by the processing system, one of amplification, attenuation or both.

9. The method of claim 1, wherein a frequency resolution of the self-interference channel response is prescribed by a mobile network operator.

10. The method of claim 1, wherein the predetermined mobile cellular frequency channel comprises a receiver frequency band of a channel allocation standardized according to the Third-Generation Partnership Project (3GPP).

11. The method of claim 1, wherein the first and second sub-bands are assigned by a scheduler and comprises a group of physical resource blocks, each physical resource block of the group of physical resource blocks comprising twelve consecutive subcarriers for each one 0.5 millisecond time slot.

12. A device, comprising:
a processing system including a processor; and
a memory that stores executable instructions that, when executed by the processing system, facilitate performance of operations, the operations comprising:
determining a self-interference channel response of a transceiver of a mobile base station comprising a transmitter and a receiver, wherein the self-interference channel response spans a plurality of sub-bands of a predetermined mobile cellular frequency channel;
selecting a first sub-band of the plurality of sub-bands according to the self-interference channel response;
determining, at the receiver, an estimate of a first coupled transmit power level of the transmitter when operating within the first sub-band; and
reducing a sensitivity of the receiver according to the first coupled transmit power level to maximum receiver sensitivity, while also maintaining operation of the receiver within a substantially linear region to permit simultaneous transmission within the first sub-band and reception within a second sub-band of the plurality of sub-bands at the mobile base station.

13. The device of claim 12, wherein the selecting the first sub-band further comprises:
determining a target region of the self-interference channel response having a self-interference channel response comparatively lower than another region of the self-interference channel response; and
associating the first sub-band with the target region.

14. The device of claim 13, wherein the determining the estimate of the first coupled transmit power level further comprises:
determining a transmit power level of the transmitter; and
calculating the first coupled transmit power level according to the transmit power level and the self-interference channel response of the target region.

15. The device of claim 12, wherein operation of the transmitter within the first sub-band comprises applying orthogonal frequency division multiplexing (OFDM) to a transmit signal.

16. The device of claim 12, wherein the first sub-band at least partially overlaps the second sub-band at the mobile base station.

17. A non-transitory, machine-readable medium, comprising executable instructions that, when executed by a processing system including a processor, facilitate performance of operations, the operations comprising:
determining a self-interference channel response of a transceiver of a mobile base station comprising a transmitter and a receiver, wherein the self-interference channel response spans a plurality of sub-bands of a predetermined mobile cellular frequency channel;
identifying a first sub-band of the plurality of sub-bands according to the self-interference channel response;
determining, at the receiver, an estimate of a first coupled transmit power level of the transmitter when operating within the first sub-band; and
adjusting a receiver sensitivity according to the first coupled transmit power level to obtain an adjustment adapted to increase receiver sensitivity, while restricting operation of the receiver to a substantially linear region, the adjustment allowing transmission within the first sub-band and reception within a second sub-band of the plurality of sub-bands to occur simultaneously at the mobile base station.

18. The non-transitory, machine-readable medium of claim 17, wherein the identifying the first sub-band further comprises:
determining a target region of the self-interference channel response having a self-interference channel response comparatively lower than another region of the self-interference channel response; and
associating the first sub-band with the target region.

19. The non-transitory, machine-readable medium of claim 18, wherein the determining the estimate of the first coupled transmit power level further comprises:
determining a transmit power level of the transmitter; and
calculating the first coupled transmit power level according to the transmit power level and the self-interference channel response of the target region.

20. The non-transitory, machine-readable medium of claim 17, wherein the first sub-band at least partially overlaps the second sub-band at the mobile base station.

* * * * *